United States Patent
Lee et al.

(10) Patent No.: US 10,911,436 B2
(45) Date of Patent: Feb. 2, 2021

(54) METHOD AND DEVICE FOR REGISTERING AND CERTIFYING DEVICE IN WIRELESS COMMUNICATION SYSTEM

(71) Applicant: Samsung Electronics Co., Ltd., Suwon-si (KR)

(72) Inventors: Dong-Ik Lee, Seongnam-si (KR); Dae-Dong Kim, Seongnam-si (KR); Hee-Dong Kim, Namyangju-si (KR); Chung-Yong Eom, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 16/126,825

(22) Filed: Sep. 10, 2018

(65) Prior Publication Data

US 2019/0028893 A1 Jan. 24, 2019

Related U.S. Application Data

(63) Continuation of application No. 14/909,385, filed as application No. PCT/KR2014/007100 on Aug. 1, 2014, now Pat. No. 10,178,550.

(30) Foreign Application Priority Data

Aug. 8, 2013 (KR) .......................... 10-2013-0094069

(51) Int. Cl.
*H04L 29/06* (2006.01)
*H04W 12/06* (2009.01)
(Continued)

(52) U.S. Cl.
CPC .......... *H04L 63/0823* (2013.01); *H04L 63/08* (2013.01); *H04L 63/083* (2013.01);
(Continued)

(58) Field of Classification Search
CPC ... H04L 63/08; H04L 63/0823; H04L 63/083; H04W 12/06; H04W 76/10; H04W 84/12
(Continued)

(56) References Cited

U.S. PATENT DOCUMENTS 7,444,507 B2 10/2008 Mak et al.
7,707,405 B1 4/2010 Gilman et al.
(Continued)

FOREIGN PATENT DOCUMENTS

CN 1571407 A 1/2005
JP 2009-111835 A 5/2009
(Continued)

OTHER PUBLICATIONS

NPL Search Results (Year: 2020).*
(Continued)

*Primary Examiner* — Syed A Zaidi
(74) *Attorney, Agent, or Firm* — Jefferson IP Law, LLP

(57) ABSTRACT

A gateway (GW) in a wireless communication system, according to the present disclosure is provided. The GW generates self-signed authentication information, allocates the self-signed authentication information to at least one device, transmits a registration request message for requesting registration of the at least one device to a server if a certificate channel with the at least one device is generated based on the self-signed authentication information, and transmits certificate information for the at least one device to the at least one device if the certificate information for the at least one device is received from the server.

18 Claims, 15 Drawing Sheets

(51) Int. Cl.
*H04W 76/10* (2018.01)
*H04W 84/12* (2009.01)

(52) U.S. Cl.
CPC ....... *H04W 12/0609* (2019.01); *H04W 76/10* (2018.02); *H04W 84/12* (2013.01)

(58) Field of Classification Search
USPC .......................................................... 726/7
See application file for complete search history.

(56) References Cited

U.S. PATENT DOCUMENTS

| | | |
|---|---|---|
| 7,966,654 B2 | 6/2011 | Crawford |
| 2004/0133689 A1* | 7/2004 | Vasisht ............... H04L 61/2061 709/228 |
| 2004/0250062 A1 | 12/2004 | Douglas |
| 2005/0076198 A1 | 4/2005 | Skomra et al. |
| 2006/0020784 A1 | 1/2006 | Jonker et al. |
| 2006/0294381 A1 | 12/2006 | Mitchell et al. |
| 2007/0123223 A1 | 5/2007 | Letourneau et al. |
| 2008/0295154 A1 | 11/2008 | Suh et al. |
| 2009/0163201 A1* | 6/2009 | Wormald ............... H04L 61/157 455/426.2 |
| 2009/0219850 A1* | 9/2009 | Lin ...................... H04L 12/185 370/312 |
| 2009/0319788 A1* | 12/2009 | Zick .................... H04L 63/0869 713/168 |
| 2011/0023108 A1 | 1/2011 | Geldermann et al. |
| 2011/0128943 A1* | 6/2011 | Shan ...................... H04L 63/08 370/338 |
| 2012/0219007 A1 | 8/2012 | Cho et al. |
| 2012/0266209 A1 | 10/2012 | Gooding et al. |
| 2013/0086644 A1 | 4/2013 | Bahn et al. |
| 2013/0094444 A1 | 4/2013 | Lai et al. |
| 2013/0204982 A1 | 8/2013 | Kim et al. |
| 2013/0252585 A1 | 9/2013 | Moshir et al. |
| 2015/0043561 A1 | 2/2015 | Xia |
| 2015/0046993 A1 | 2/2015 | Arceo |
| 2017/0269563 A1* | 9/2017 | Ha ....................... H04L 12/2809 |

FOREIGN PATENT DOCUMENTS

| | | |
|---|---|---|
| KR | 10-2005-0066637 A | 6/2005 |
| KR | 10-2009-0058362 A | 6/2009 |
| KR | 10-2010-0061188 A | 6/2010 |
| KR | 10-2011-0025031 A | 3/2011 |
| KR | 10-2012-0033820 A | 4/2012 |
| KR | 10-2012-0097105 A | 9/2012 |
| KR | 10-2013-0034754 A | 4/2013 |

OTHER PUBLICATIONS

NPL Search Terms (Year: 2020).*
Ok, Sang, and HoJin Park. "Implementation of initial provisioning function for home gateway based on open service gateway initiative platform." 2006 8th International Conference Advanced Communication Technology. vol. 3. IEEE, 2006. (Year: 2006).*
Balfanz Dirk, et al. "Network-in-a-Box: How to Set Up a Secure Wireless Network in Under a Minute." USENIX Security Symposium. vol. 207. 2004.
Kambourakis, G., et al. "Advanced SSUTLS-based authentication for secure WLAN-3G interworking." IEE Proceedings-Communications 151.5 (2004): 501-506.
Indian Examination Report dated Oct. 21, 2019, issued in Indian Patent Application No. 201627006175.
Korean Decision of Grant dated May 27, 2020, issued in Korean Patent Application No. 10-2020-0001981.

* cited by examiner

10,911,436 B2

METHOD AND DEVICE FOR REGISTERING AND CERTIFYING DEVICE IN WIRELESS COMMUNICATION SYSTEM

CROSS-REFERENCE TO RELATED APPLICATION(S)

This application is a continuation application of prior U.S. National Stage application number PCT/KR2014/007100, filed on Aug. 1, 2014, which claimed the benefit of a Korean patent application number 10-2013-0094069 filed on Aug. 8, 2013 in the Korean Intellectual Property Office, the disclosure of each of which is incorporated by reference herein in its entirety.

TECHNICAL FIELD

The present disclosure relates to a method and apparatus for registering and authenticating a device in a wireless communication system.

BACKGROUND

The gateway (GW) of the related art is not a subject of authentication and registration indoors such as a home or an office, but serves as a connection passage between an external server/system and an internal control device or service device and an agent for supporting the connection passage.

A Wi-Fi device performing communication with an indoor GW has several security problems in an access point (AP) registration/authentication process. Generally, this is because problems such as a use of service set identifier (SSID) which can be inferred in the registration/authentication process of the Wi-Fi device, an exposure of a password, and a key management occur. Therefore, the Wi-Fi device generally uses a separate payload encryption scheme when privacy data is transmitted and received through Wi-Fi communication.

In a privacy data encryption process, a symmetric key generation scheme is usually used. The symmetric key generation scheme refers to a scheme which generates a symmetric key based on a unique personal identification number (PIN)/key or a password, and then uses the corresponding symmetric key as an encryption key through sharing between the symmetric keys.

A Wi-Fi device in a home network providing a home service always receives an account from a server and uses a security PIN and password corresponding to the account. However, the scheme has a difficulty of server maintenance management costs and should be connected to a server at a time point of device registration.

In the prior art, a registration scheme through a one-way web server account has been used as a scheme for the authentication at a time point of service registration of the Wi-Fi device, which has problems in weak security.

Further, in the symmetric key generation scheme of the related art for forming a security channel, the PIN/key can be inferred, and if the symmetric key itself or either side of the mutual communication becomes exposed, a problem in the security channel for both sides may be brought about.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for registering and authenticating a device in a wireless communication system.

Another aspect of the present disclosure is to provide a method and apparatus, which grants a certificate issuing function for a Wi-Fi device to a gateway (GW) and enables the GW to register, as a deputy, the Wi-Fi device to a server, thereby enabling execution of a safer authentication and a communication having a higher security.

Another aspect of the present disclosure is to provide a method and apparatus for enhancing authentication information security using a certificate use scheme, which is an asymmetric key scheme, in a device authentication process.

In addition, the embodiment of the present disclosure provides a method and apparatus for performing more secure and convenient registration and authentication processes which minimizes a security threat possibility by applying an additional security technique and technology during registration and authentication.

In accordance with an aspect of the present disclosure, a first method for registering and authenticating a device by a GW in a wireless communication system is provided. The method includes generating self-signed authentication information, assigning the generated self-signed authentication information to at least one device, transmitting, when an authentication channel with the at least one device is generated based on the self-signed authentication information, a registration request message requesting registration for the at least one device to a server, and transmitting, when authentication information on the at least one device has been received from the server, the received authentication information to the at least one device.

In accordance with another aspect of the present disclosure, a second method for performing registration and authentication by a device in a wireless communication system is provided. The method includes receiving self-signed authentication information generated by a GW, receiving from the GW, when an authentication channel with the GW is generated based on the self-signed authentication information, authentication information generated by a server through the authentication channel, and receiving a service from the server based on the received authentication information.

In accordance with another aspect of the present disclosure, a third method of registering and authenticating a device by a server in a wireless communication system is provided. The method includes receiving a message requesting registration for at least one device from a GW, generating authentication information for the at least one device, and transmitting the generated authentication information to the GW, wherein the at least one device corresponds to at least one device which receives self-signed authentication information generated by the GW.

In accordance with another aspect of the present disclosure, a GW in a wireless communication system as a first apparatus is provided. The GW includes a controller configured to generate self-signed authentication information and assign the generated self-signed authentication information to at least one device, a receiver configured to receive authentication information on the at least one device from a server, and a transmitter configured to transmit a registration request message requesting registration for the at least one device to the server and transmits the received authentication information to the at least one device when an authentication channel with the at least one device is generated based on the self-signed authentication information.

In accordance with another aspect of the present disclosure, a device in a wireless communication system as a second apparatus is provided. The device includes a receiver, and a controller configured to control the receiver to receive self-signed authentication information generated by a GW, and when an authentication channel with the GW is generated based on the self-signed authentication information, receive authentication information generated by a server from the GW through the authentication channel and receive a service from the server based on the received authentication information.

In accordance with another aspect of the present disclosure, a server in a wireless communication system as a third apparatus is provided. The server includes a receiver that receives a message requesting registration for at least one device from a GW, a controller that generates authentication information for the at least one device, and a transmitter that transmits the generated authentication information to the GW, wherein the at least one device corresponds to a device receiving self-signed authentication information generated by the GW.

The present disclosure may perform registration of a Wi-Fi device even in a sever offline environment because a GW registers, as a deputy, the Wi-Fi device to a server in a wireless communication system such as a home network. Therefore, in the present disclosure, a configuration and registration time interval for the Wi-Fi device can be reduced.

Further, when a plurality of Wi-Fi devices which desires to be registered to the server for a service subscription exist, the GW can integrally register the plurality of the Wi-Fi devices to the server. Accordingly, maintenance costs can be reduced.

Also, the present disclosure can improve a security of a registration time point because a registration process is performed based on a specific interface. In addition, the present disclosure can enhance security on a corresponding channel by performing mutual authentication through a certificate after device registration, and can easily expand a service based on the certificate.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
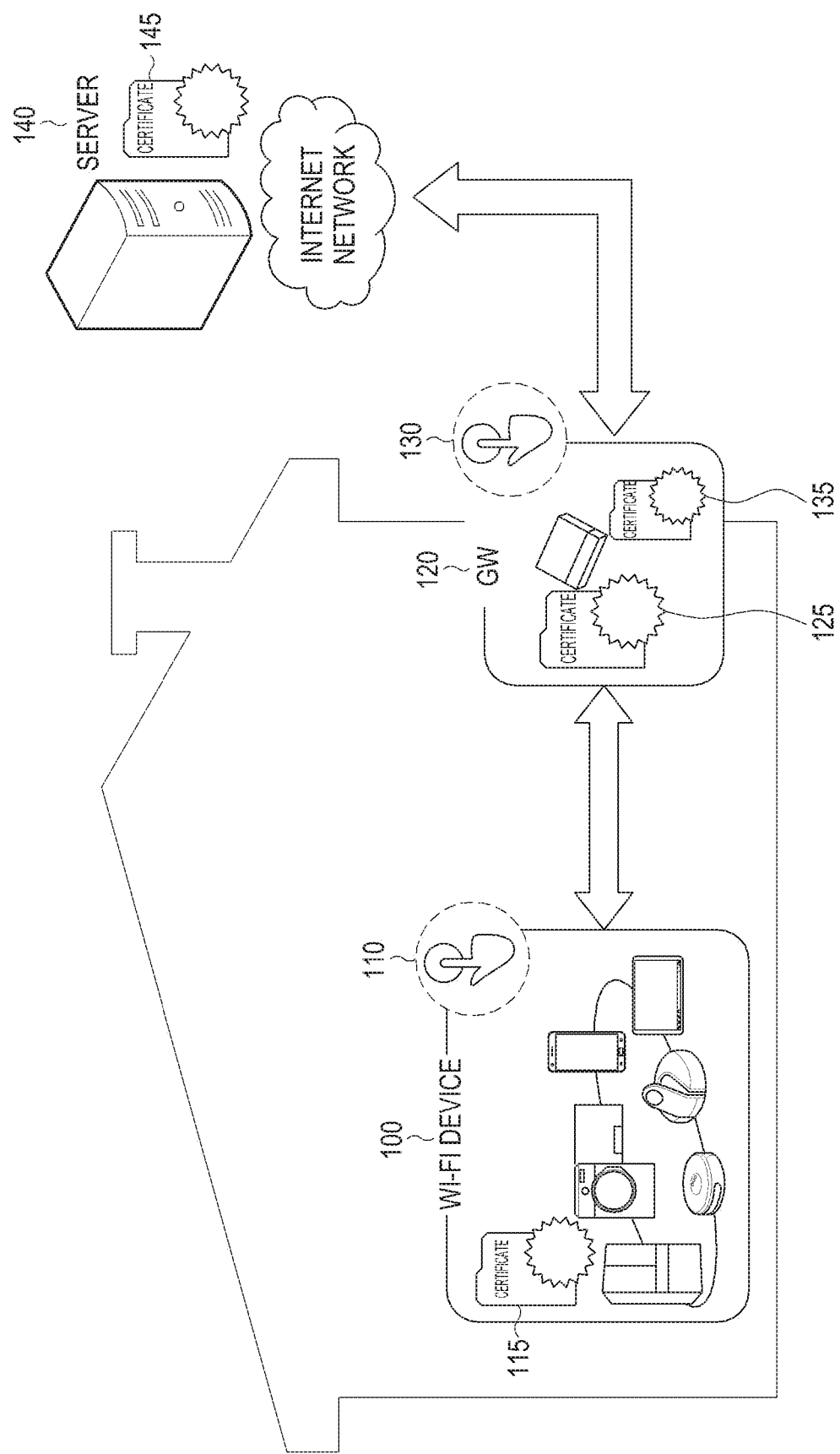
FIG. 1 is a diagram illustrating a configuration of a device in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that singular forms "a," "an," and "the" include plural referents unless the context clearly dictates otherwise. Thus, for example, reference to a "component surface" includes reference to one or more of such surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments of the present disclosure, and are not intended to limit the present disclosure. In the present disclosure, the terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

According to various embodiments of the present disclosure, an electronic device may include a communication functionality. The terminal may, for example, be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device (e.g., head-mounted device (HMD), electronic clothes, an electronic bracelet, an electronic necklace, an electronic appcessory, an electronic tattoo, or a smart watch).

According to various embodiments of the present disclosure, the electronic device may be a smart home appliance with a communication functionality. The smart home appliance may, for example, be a television (TV), a digital versatile disc (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the present disclosure, the electronic device may be a medical appliance (e.g., magnetic resonance angiography (MRA) device, magnetic resonance imaging (MRI) device, computed tomography (CT) device, and ultrasonic device), a navigation device, a global positioning system (GPS) receiver, an event data recorder (EDR), a flight data recorder (FDR), an automotive infotainment device, a marine electronic device (e.g., ship navigation device and a gyrocompass), avionics, security equipment, or an industrial or home robot.

According to various embodiments of the present disclosure, the electronic device may be a part of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of the present disclosure, the electronic device may be a combination of the above-mentioned devices. Further, it will be apparent to those skilled in the art that the terminal according to various embodiments of the present disclosure is not limited to the above-mentioned devices.

According to various embodiments of the present disclosure, a terminal may be an electronic device as an example.

The present disclosure provides a method and apparatus for registering and authenticating a device in a wireless communication system. A device provided in the embodiment of the present disclosure may be a home appliance such as a washing machine, a refrigerator, and a television, in which wireless communication is possible, a portable phone, or a tablet PC. However, the device may be variously changed without being limited to the device as described above.

Hereinafter, the device is a device performing Wi-Fi communication and a method and apparatus for registering and authenticating the device based on the Wi-Fi communication will be described as an example. However, the method and apparatus provided in the present disclosure may be used by being applied to a wireless communication system in which another communication in addition to the Wi-Fi communication is used. Meanwhile, hereinafter, it should be noted that the terms of a certificate and authentication information can be mixed.

With reference to FIG. 1, a wireless communication system according to the embodiment of the present disclosure will be described.

FIG. 1 is a diagram illustrating a configuration of a wireless communication system according to an embodiment of the present disclosure.

Referring to FIG. 1, the wireless communication system may be configured in the form of a home network as an example, and include a Wi-Fi device 100, a gateway (GW) 120, and a server 140.

The Wi-Fi device 100 indicates a device which is included in the home network, and receives and uses a home network service from the server 140 on the basis of Wi-Fi communication. The Wi-Fi device 100 may be one of Wi-Fi devices (hereinafter, referred to as a "display Wi-Fi device") including a display unit such as a mobile terminal and a TV and a Wi-Fi device which does not include the display unit such as a refrigerator and a washing machine (hereinafter, referred to as a "headless Wi-Fi device").

The Wi-Fi device 100 is required to be registered to the server 140 connected to an external network and an access point (AP) to receive a service. In order to register the Wi-Fi device 100 to the server 140, a registration process for the GW 120 of the Wi-Fi device 100 should be first performed. This is because the GW 120 performs a process in which the Wi-Fi device 100 is registered to the server 140 when the Wi-Fi device 100 is registered in the GW 120. That is, the registration to server 140 of the Wi-Fi 100 device is performed through the GW 120.

When the Wi-Fi device 100 is registered, the GW 120 transmits information on the Wi-Fi device 100 to the server 140. Then, the server 140 assigns unique authentication information to the Wi-Fi device 100 and transmits the authentication information to the GW 120 so that the corresponding authentication information can be transmitted to the Wi-Fi device 100.

The process as described above may be performed in a background mode, and may be performed through a security channel based on authentication information between the Wi-Fi device 100 and the GW 120, and authentication information between the GW 120 and the server 140.

To this end, the GW 120 has an issuing function of self-signed authentication and assigns authentication information 115 to the Wi-Fi device 100 to be registered. The authentication information 115 of the Wi-Fi device 100 may include public authentication information 115 of a certificate authority (CA) issuing corresponding authentication information of the GW 120 or a sub CA, and may be provided through software development kit (SDK).

The Wi-Fi device 100 may form a one-way authentication channel which is authenticated from the GW 120 based on the authentication information 115 and then is registered to the GW 120 when the authentication information 125 is acquired. In addition, the server 140 and the GW 120 have authentication information 135 and 145 issued from an identical root/sub CA so that a channel for two-way authentication during interconnection can be formed.

Meanwhile, the Wi-Fi device 100 and the GW 120 may include interfaces 110 and 130 generating a registration event for performing each registration process. The interfaces 110 and 130 may be a specific menu which is configured in a physical button, a web page, and an application and a user can select (input or click).

The Wi-Fi device 100 and the GW 120 may perform the registration process during a predetermined time interval when the registration event occurs in each of the Wi-Fi device 100 and the GW 120, and do not perform the registration process in other time intervals (e.g., after the predetermined time interval). In this event, the Wi-Fi device 100 and the GW 120 may drive a timer having a predetermined time interval when the registration event occurs in each of the Wi-Fi device 100 and the GW 120.

Hereinafter, a method for registering and authenticating the Wi-Fi device performed in the wireless communication system as shown in FIG. 1 will be described.

In the embodiment of the present disclosure, the following four processes should be performed to register the Wi-Fi device 100 to the server 140. Processes (2-1) and (2-2) among the following four processes may be selectively performed according to a characteristic (existence or non-existence of display) of a corresponding Wi-Fi device.

(1) A process in which the GW120 is registered to the server 140

(2-1) A process in which the Wi-Fi device (headless Wi-Fi device) 100 is registered to the GW 120

(2-2) A process in which the Wi-Fi device (display Wi-Fi device) 100 is registered to the GW 120

(3) A process in which the GW 120 registers the Wi-Fi device 100 to the server 140

Hereinafter, with reference to FIGS. 2 to 5, the four processes will be described, respectively.

(1) A Process in which the GW120 is Registered to the Server 140

Figure 2:
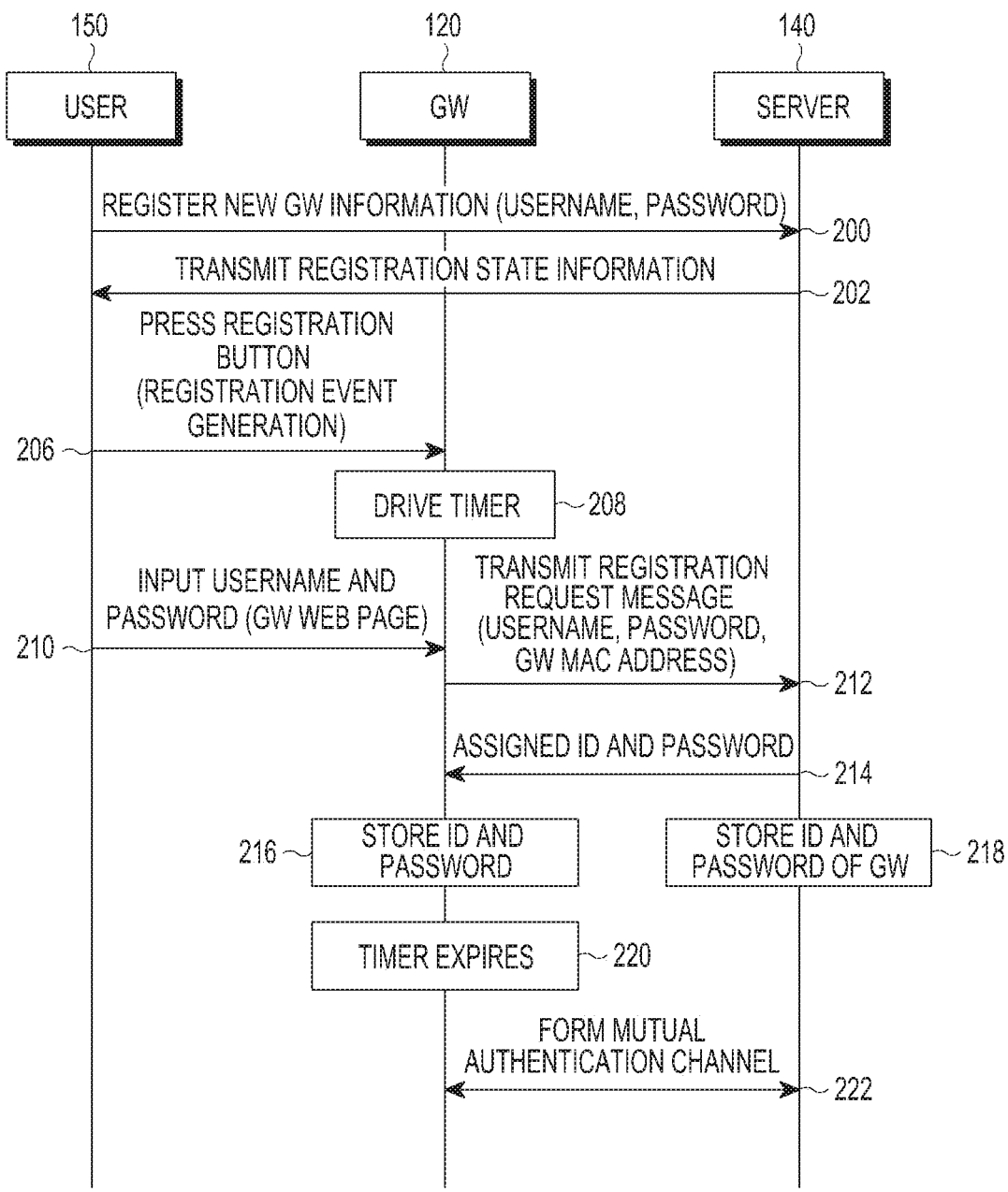
FIG. 2 is a signal flow chart illustrating a process in which a gateway (GW) is registered in a server in a wireless communication system according to an embodiment of the present disclosure.

FIG. 2 is a signal flow chart illustrating a process in which a GW is registered to a server in a wireless communication system according to an embodiment of the present disclosure.

Referring to FIG. 2, in operation 200, when a user 150 desires to register the GW 120 to the server 140 as a new GW, the user generates a username and password related to the GW 120 as new GW information. Further, the user 150 transmits the new GW information to the server 140 to register the new GW information in operation 200. Then, the server 140 receives and registers the new GW information. Further, the server 140 provides, to the user 150, registration state information identifying whether the new GW information has been registered in operation 202.

An operation between the user 150 and the server 140 may be performed through a server management web page (or application). For example, the user 150 selects a menu, in which a new GW can be registered, by logging in to the server management web page. In addition, the user 150 transmits the new GW information to the server 140 through the selected menu and the server 140 displays a registration result of the new GW information on a corresponding web page, thereby providing the registration state information to the user 150.

When the user 150 identifies that the new GW information has been registered to the server 140 based on the registration state information, a registration event is generated in operation 206. As described above, the registration event may be generated by the user 150 through a separate interface. Hereinafter, it will be described that the registration event is generated by a push (or touch) of a "registration button" as an example.

The GW 120 enters into a registration mode when the registration event is generated, and drives a timer in operation 208. The timer may be configured as a duration time (e.g., three minutes) in which a registration process can continue, and the duration time of the timer may be adjusted depending on the implementation.

When the GW 120 enters into the registration mode, the user 150 accesses a web page of the GW 120 and then inputs a username and a password which are the new GW information registered to the server 140 in operation 210. Then, the GW 120 transmits a registration request message including the username, the password, and a media access control (MAC) address of the GW 120 to the server 140 in operation 212. Herein, the registration request message may be transmitted to the server 140 in a form of a hypertext transfer protocol (HTTP) Send Post (HTTPS) using an HTTP Post scheme.

When the registration request message has been received, the server 140 determines whether the username and the password included in the registration request message coincide with previously registered username and password. When the username and the password included in the registration request message coincide with the previously registered username and password, the server 140 assigns an identifier (ID) and a password as authentication information to the GW 120.

In addition, the server 140 transmits the assigned ID and password to the GW 120 through an HTTP POST message in operation 214. Meanwhile, the ID assigned to the GW 120 may be a unique ID or a Jabber ID, and the assigned password may be a password for GW management used for the server 140 to manage the GW 120.

The GW 120 stores the ID and password assigned by the server 140 as authentication information for mutual authentication with the server 140 in operation 216. Further, the server 140 also stores the ID and password of the GW 120 in operation 218 and registers the GW 120 as the new GW. Meanwhile, when the timer expires in operation 220, the GW 120 releases the registration mode and terminates all registration processes.

When the GW 120 is registered to the server 140 and the ID and password are stored in each of the GW 120 and the server 140 as the authentication information for the GW 120 through the processes, the GW 120 and the server 140 may perform communication by forming a channel in which the mutual authentication is possible based on the authentication information in operation 222.

(2-1) A Process in which the Wi-Fi Device (Headless Wi-Fi Device) 100 is Registered to the GW 120

Figure 3:
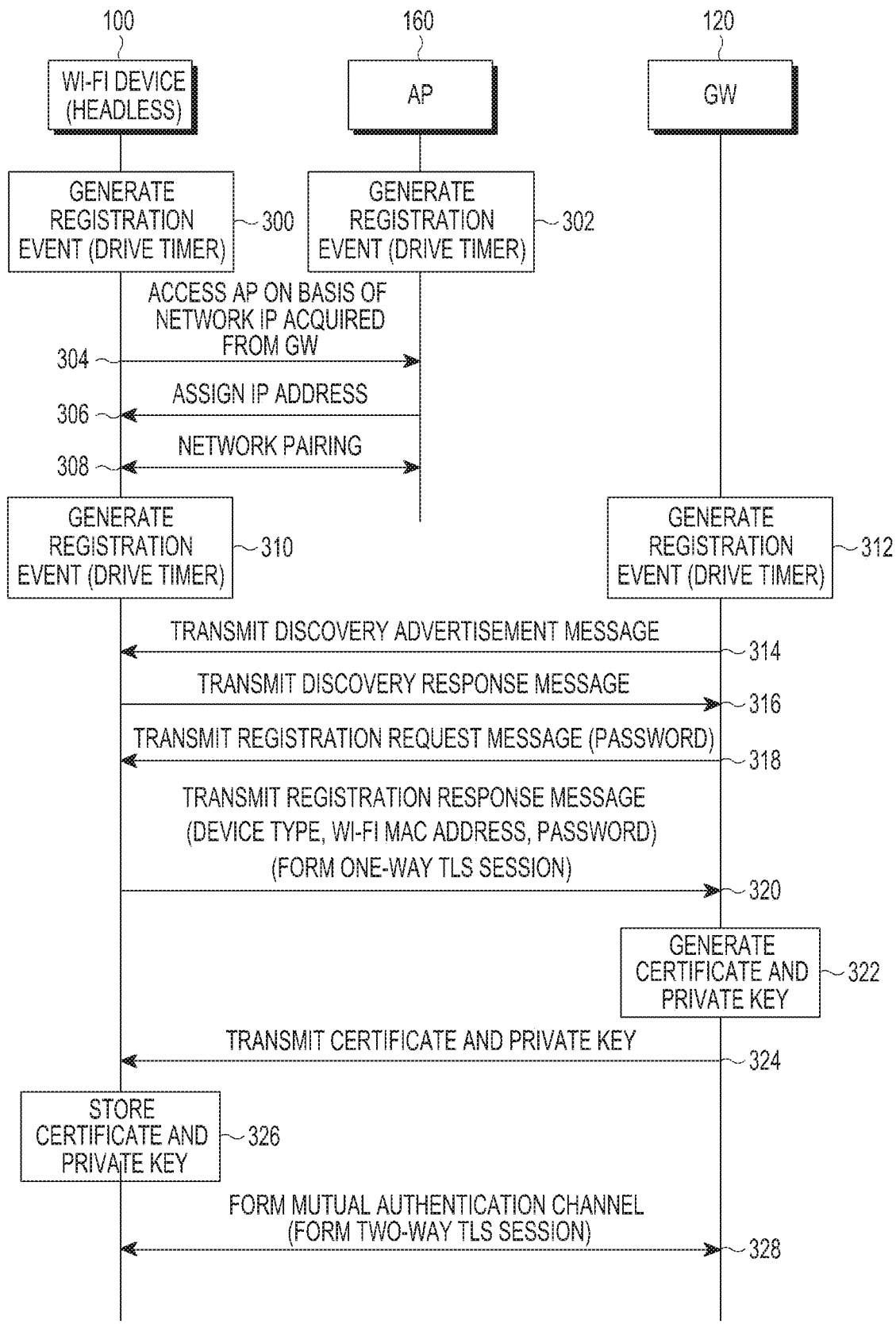
FIG. 3 is a signal flow chart illustrating a process in which a headless Wi-Fi device is registered in a GW in a wireless communication system according to an embodiment of the present disclosure.

FIG. 3 is a signal flow chart illustrating a process in which a headless Wi-Fi device is registered to a GW in a wireless communication system according to an embodiment of the present disclosure.

In FIG. 3, a case in which the Wi-Fi device 100 is a headless Wi-Fi device will be described.

Referring to FIG. 3, the Wi-Fi device 100 should first perform an operation for network pairing to be registered to the GW 120. To this end, the Wi-Fi device 100 performs an operation for the network pairing with an AP 160 within a home network as shown in operations 300 to 308.

Specifically, when a registration event is generated by pressing a registration button (e.g., a Wi-Fi protected setup (WPS) button) by a user 150, the Wi-Fi device 100 and the AP 160 drives a timer, respectively and enter into the registration mode in operations 300 and 302.

The Wi-Fi device 100 acquires a Wi-Fi network internet protocol (IP) from the GW 120 and accesses the AP 160 based on the acquired Wi-Fi network IP in operation 304. When the Wi-Fi device 100 accesses the AP 160, the AP 160 assigns an IP address to the Wi-Fi device 100 in operation 306. Further, the Wi-Fi device 100 performs the network pairing based on the assigned IP address in operation 308.

When the Wi-Fi device 100 performs the network pairing, the user 150 may generate a registration event by pressing registration buttons of the Wi-Fi device 100 and the GW 120. When the registration event is generated in operations 310 and 312, the Wi-Fi device 100 and the GW 120 drive a timer for performing the registration processor.

The user 150 may request, to the GW 120, to provide information on a Wi-Fi device which can be currently registered in a product registration page menu by accessing a GW management web page (or application). Therefore, the GW 120 performs a discovery operation for detecting the corresponding Wi-Fi device. The discovery operation may be performed based on a simple service discovery protocol (SSDP)/multicast domain name system (mDNS) or another discovery protocol.

The GW 120 broadcasts a discovery advertisement message in operation 314. Then, the Wi-Fi device 100 receives the discovery advertisement message and transmits the discovery response message to the GW 120 in operation 316. Herein, information (e.g., a Wi-Fi MAC address and an IP address) on the Wi-Fi device 100 may be included in the discovery response message.

When the discovery response message has been received, the GW 120 may provide information on the detected Wi-Fi device to the user 150 as shown in table 1 below.

TABLE 1

| Device information | MAC address | Unique ID | Node ID | State information | Identification button |
|---|---|---|---|---|---|
| Ref . . . etc | IEEE address | — | IP address | Ready | [selection] |
| . . . | . . . | . . . | . . . | . . . | . . . |

Referring to Table 1, the device information indicates an identification number and device type information of the Wi-Fi device 100, the MAC address indicates a MAC address of the Wi-Fi device 100, the Unique ID indicates an ID assigned by the server 140 (corresponding information is not yet included in table 1 since the Wi-Fi device 100 is registered to the GW 120), the Node ID indicates an IP address of the Wi-Fi device 100, the state information indicates information indicating whether the Wi-Fi device 100 can be registered to the GW 120 (or is in a registration mode), and the identification button indicates an interface for selecting, by the user 150, the Wi-Fi device 100 as a device to be registered to the GW 120.

When the user 150 selects the Wi-Fi device 100 as the device to be registered to the GW 120 through the identification button, the GW 120 transmits a registration request message to the Wi-Fi device 100 in operation 318. Herein, the registration request message may include and transmit a password for a message integrity check. The password may be randomly generated by the GW 120.

When the registration request message has been received, the Wi-Fi device 100 transmits, to the GW 120, a registration response message including a password included in the registration request message, a device type of the Wi-Fi device 100, and a Wi-Fi MAC address in operation 320. Herein, the registration response message may be transmitted in the HTTP Post message type. Further, as the registration response message is transmitted, a one-way transport layer security (TLS) session may be formed between the Wi-Fi device 100 and the GW 120.

The GW 120 performs an integrity check for the registration response message based on whether a password included in the registration response message is identical to the password included in the registration request message transmitted in operation 318. The GW 120 determines that the registration response message has the integrity when the two passwords are identical. In addition, the GW 120 generates a certificate and a private key (PKCS #12 or PEM) as the authentication information on the Wi-Fi device 100 in operation 322, and transmits the generated certificate and private key to the Wi-Fi device 100 in operation 324.

The Wi-Fi device 100 stores the certificate and private key in operation 326 and the registration process is terminated. Then, in operation 328, the Wi-Fi device 100 forms a channel (two-way TLS session), in which mutual authentication is possible with the GW 120, based on the certificate and private key, thereby performing communication.

(2-2) A Process in which the Wi-Fi Device (Display Wi-Fi Device) 100 is Registered to the GW 120

Figure 4:
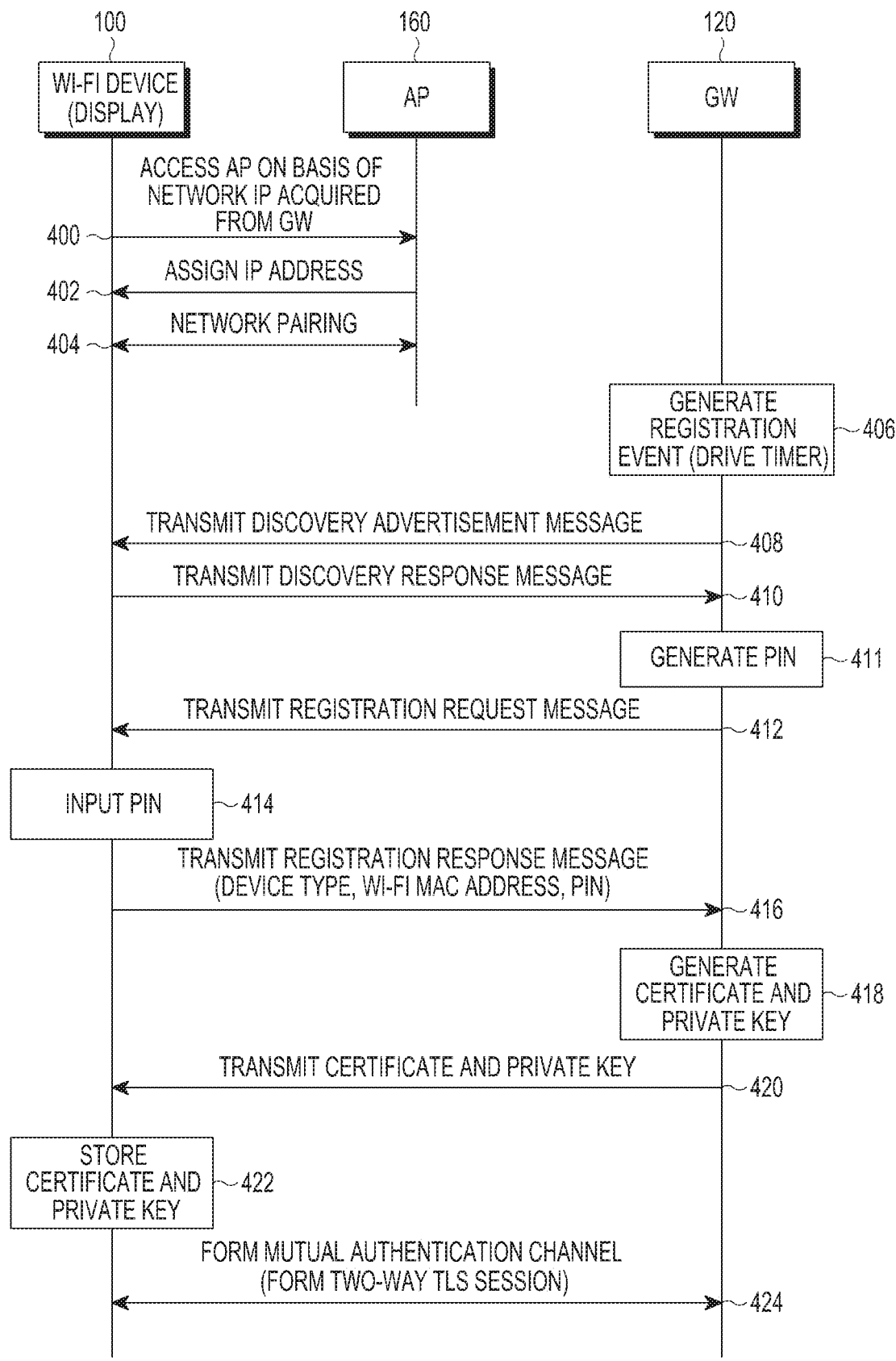
FIG. 4 is a signal flow chart illustrating a process in which a display Wi-Fi device is registered in a GW in a wireless communication system according to an embodiment of the present disclosure.

FIG. 4 is a signal flow chart illustrating a process in which a display Wi-Fi device is registered to a GW in a wireless communication system according to an embodiment of the present disclosure.

In FIG. 4, a case in which the Wi-Fi device 100 is a display Wi-Fi device will be described.

Referring to FIG. 4, the Wi-Fi device 100 should first perform an operation for network pairing to be registered in the GW 120. To this end, the Wi-Fi device 100 performs an operation for the network pairing with an AP 160 within a home network as shown in operations 400 to 404.

The Wi-Fi device 100 acquires a Wi-Fi network IP from the GW 120 and accesses the AP 160 based on the acquired Wi-Fi network IP in operation 400. When the Wi-Fi device 100 accesses the AP 160, the AP 160 assigns an IP address to the Wi-Fi device 100 in operation 402. Further, the Wi-Fi device 100 performs the network pairing based on the assigned IP address in operation 404.

When the Wi-Fi device 100 performs the network pairing, the user 150 may generate a registration event by pressing a registration button of the GW 120. When the registration event is generated in operation 406, the GW 120 drives a timer for performing a registration process.

The user 150 may request, to the GW 120, a Wi-Fi device which can be currently registered in a product registration page menu by accessing a GW management web page (or application). Therefore, the GW 120 performs a discovery operation for detecting the corresponding Wi-Fi device. The discovery operation may be performed based on a SSDP/mDNS or another discovery protocol.

The GW 120 broadcasts a discovery advertisement message in operation 408. Then, the Wi-Fi device 100 receives the discovery advertisement message and transmits the discovery response message to the GW 120 in operation 410. Herein, information (e.g., a Wi-Fi MAC address and an IP address) on the Wi-Fi device 100 may be included in the discovery response message.

When the discovery response message has been received, the GW 120 may provide information on the detected Wi-Fi device to the user 150. The information on the detected Wi-Fi device may be provided to the user 150 in the form as shown in table 1.

When the user 150 selects the Wi-Fi device 100 as a device to be registered to the GW 120 based on the information on the detected Wi-Fi device, the GW 120 generates a personal identification number (PIN) in operation 411. Further, the GW 120 allows the PIN to be included in the registration request message and then transmits the registration request message to the Wi-Fi device 100 in operation 412. Herein, the PIN may be used to check integrity of the registration request message and may be configured by a number or character randomly generated by the GW 120.

When the registration request message has been received, the Wi-Fi device 100 displays an input window, which can receive an input of a PIN identical to the PIN included in the registration request message from the user 150, in a display unit. When the user 150 inputs the PIN in the input window in operation 414, the Wi-Fi device 100 transmits, to the GW 120, a registration response message including the input PIN, a device type of the Wi-Fi device 100, and a Wi-Fi MAC address in operation 416. Herein, the registration response message may be transmitted in the HTTP Post message form, and a one-way TLS session may be formed as the registration response message is transmitted.

The GW 120 performs an integrity check for the registration response message based on whether the PIN included in the registration response message is identical to the PIN included in the registration request message transmitted in operation 412. The GW 120 determines that the registration response message has the integrity when the two PINs are identical. In addition, the GW 120 generates a certificate and a private key (PKCS #12 or PEM) as the authentication information on the Wi-Fi device 100 in operation 418, and transmits the generated certificate and private key to the Wi-Fi device 100 in operation 420.

The Wi-Fi device 100 stores the certificate and private key in operation 422 and the registration process is terminated. Then, in operation 424, the Wi-Fi device 100 forms a channel (two-way TLS session), in which mutual authentication is possible with the GW 120, based on the certificate and private key, thereby performing communication.

(3) A Process in which the GW 120 Registers the Wi-Fi Device 100 to the Server 140

Figure 5:
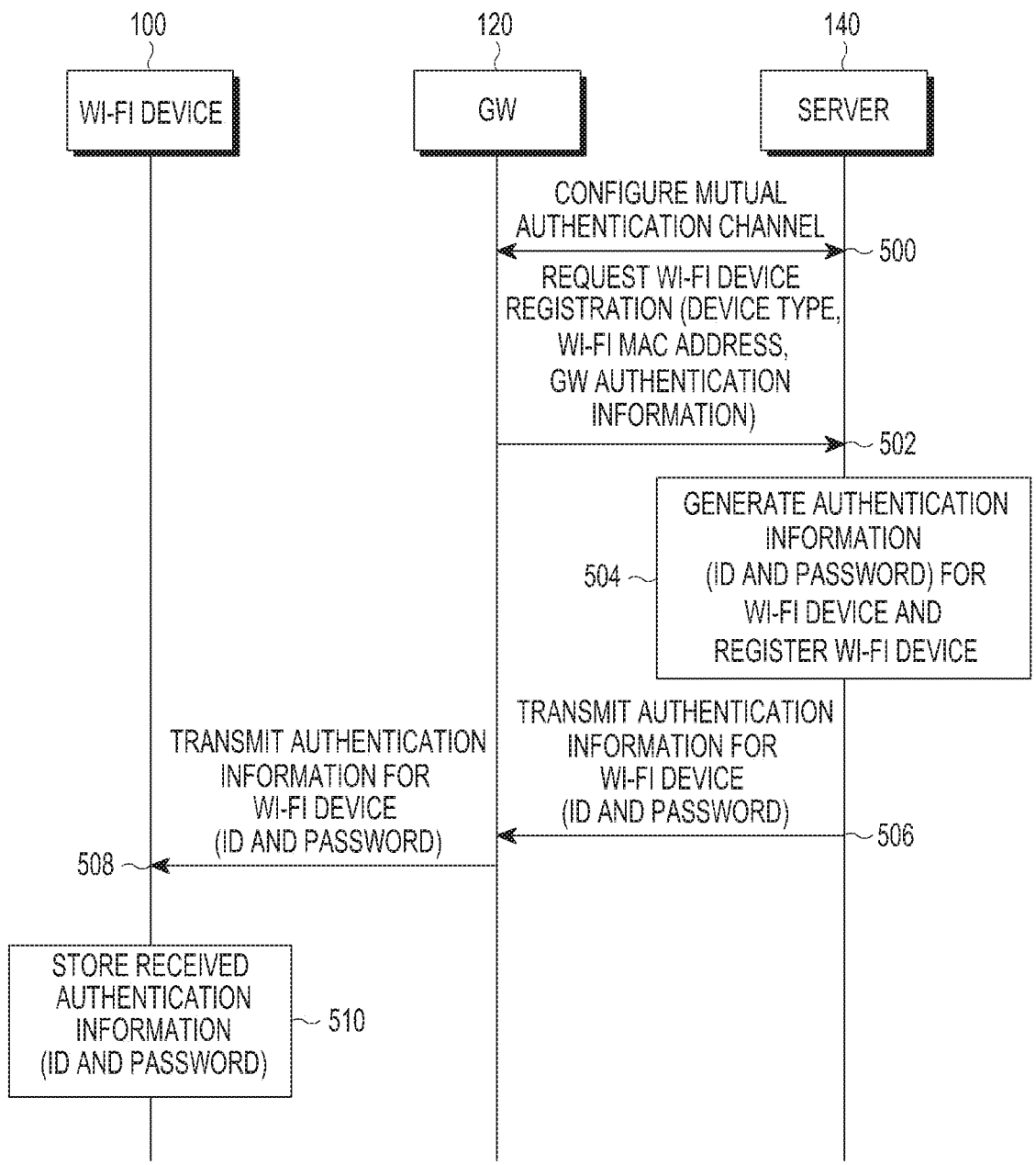
FIG. 5 is a signal flow chart illustrating a process in which a GW registers a Wi-Fi device in a server in a wireless communication system according to an embodiment of the present disclosure.

As the processes (1), (2-1), or (2-2) are performed, the GW 120 is registered to the server 140 and when the Wi-Fi device 100 is registered to the GW 120, the GW 120 performs an operation as a registration agent which registers the Wi-Fi device 100 to the server 140. With reference to FIG. 5, this will be described below.

FIG. 5 is a signal flow chart illustrating a process in which a GW registers a Wi-Fi device to a server in a wireless communication system according to an embodiment of the present disclosure.

Referring to FIG. 5, when a mutual authentication channel with the server 140 is configured the GW 120 in operation 500 as a result of the (1) process, the GW 120 transmits, to the server 140, a registration request message which requests a registration for a Wi-Fi device 100 registered through the process (2-1) or (2-2) in operation 502. Herein, the registration request message may include information of the Wi-Fi device 100 such as a device type and a Wi-Fi MAC address, and an ID and password (hereinafter, referred to as "GW authentication information") of the GW 120 assigned by the server 140 in the process (1).

When the registration request message has been received, the server 140 determines whether GW authentication information included in the registration request message coincides with GW authentication information registered in the server 140, thereby checking integrity for the registration request message. When the GW authentication information included in the registration request message coincides with GW authentication information registered in the server 140, the server 140 determines that the registration request message has integrity.

Further, the server 140 generates authentication information (ID and password) for the Wi-Fi device 100 according to the registration request message in operation 504, and registers the Wi-Fi device 100. In sequence, the server 140 transmits the generated authentication information to the GW 120 in operation 506 and the GW 120 receives the authentication information in operation 508 and then transmits the authentication information to the Wi-Fi device 100. The Wi-Fi device 100 stores the received authentication information in operation 510 and then communicates with the server 140 using the stored authentication information.

Next, an operation of each of the Wi-Fi device 100, the GW 120, and the server 140 according to the embodiment of the present disclosure will be specifically described.

Figure 6:
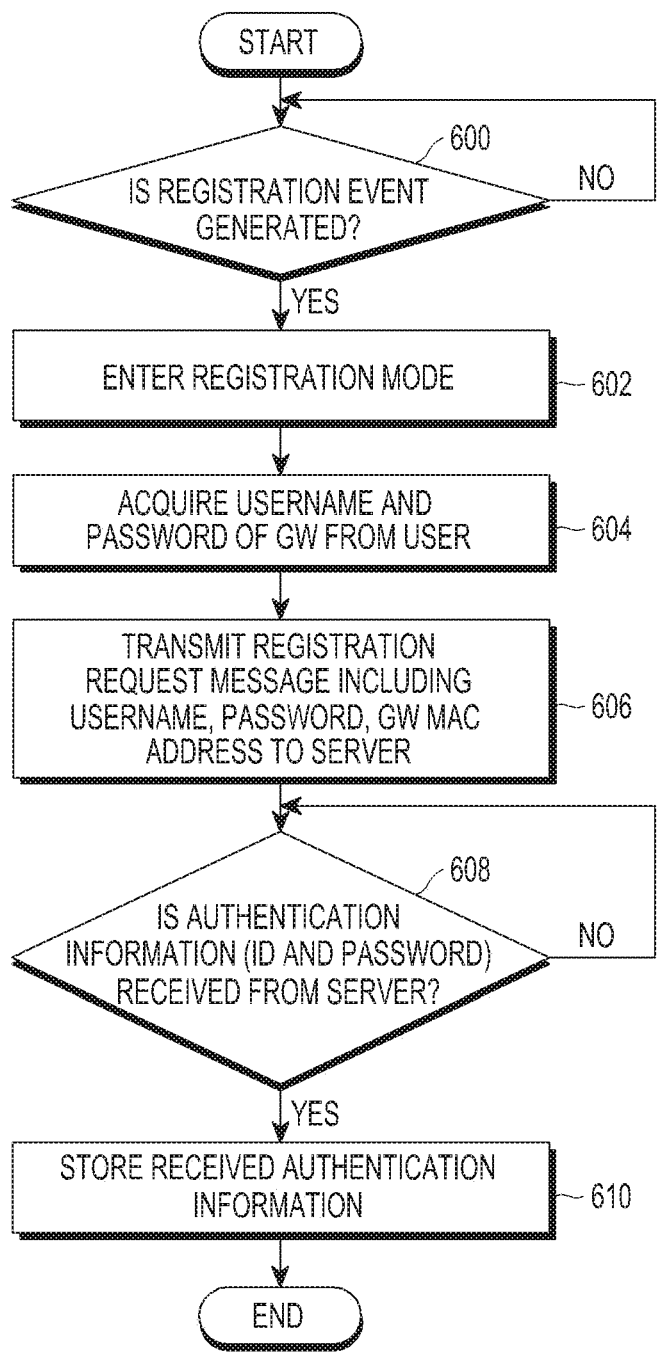
FIG. 6 is a flow chart illustrating an operation in which a GW is registered in a server in a wireless communication system according to an embodiment of the present disclosure.

FIG. 6 is a flow chart illustrating an operation in which a GW is registered to a server in a wireless communication system according to an embodiment of the present disclosure.

Referring to FIG. 6, when a registration event is generated in operation 600, the GW 120 enters into a registration mode and drives a timer in operation 602. Further, the GW 120 acquires, through a web page of the GW 120 or a separate application, a username and a password of the GW 120 registered as new GW information in the server 140 by the user 150 in operation 604.

Then, in order to be registered to the server 140, the GW 120 transmits a registration request message including the acquired username and password, and a MAC address of the GW 120 to the server 140 in operation 606. In operation 608, the GW 120 determines whether authentication information (an ID and a password) used for mutual authentication between the GW 120 and the server 140 is received from the server 140. Further, when the authentication information has been received, the GW 120 stores the received authentication information in operation 610. Then, the GW 120 forms a channel in which the mutual authentication is possible with the server 140 based on the stored authentication information, thereby performing communication.

Figure 7:
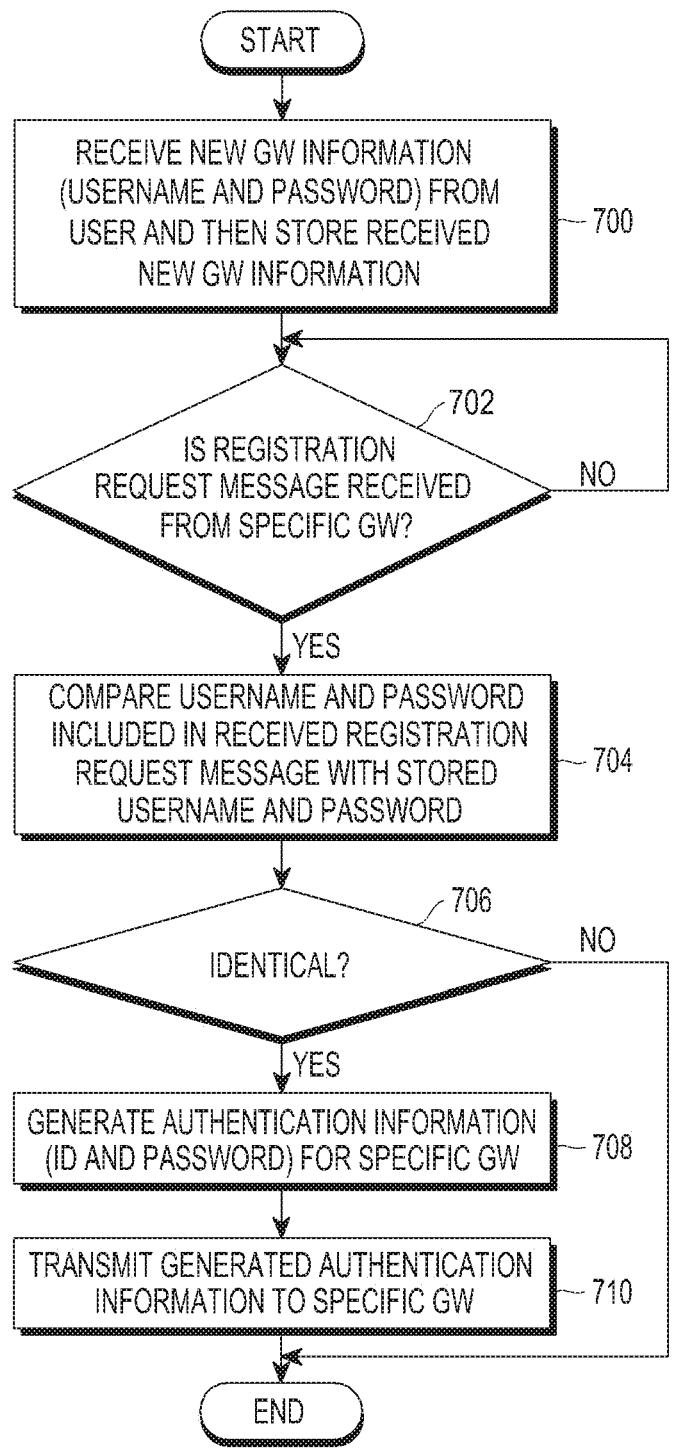
FIG. 7 is a flow chart illustrating an operation in which a GW is registered in a server in a wireless communication system according to an embodiment of the present disclosure.

FIG. 7 is a flow chart illustrating an operation in which a GW is registered in a server in a wireless communication system according to an embodiment of the present disclosure.

Referring to FIG. 7, when new GW information including a username and password has been received from a user through a server management web page (or application), the server 140 stores the received new GW information in operation 700.

In addition, when a registration request message has been received from a specific GW (e.g., the GW 120) in operation 702, the server 140 compares whether a username and password included in the registration request message are identical to the stored username and password in operation 704.

When the username and password included in the registration request message are identical to the stored username and password in operation 706, the server 140 proceeds to operation 708 and generates authentication information (an ID and a password) on a specific GW. Further, the server 140 transmits the generated authentication information to the specific GW in operation 710. Then, the generated authentication information may be used to perform communication by forming a channel in which the mutual authentication is possible with the GW 120.

Figure 8:
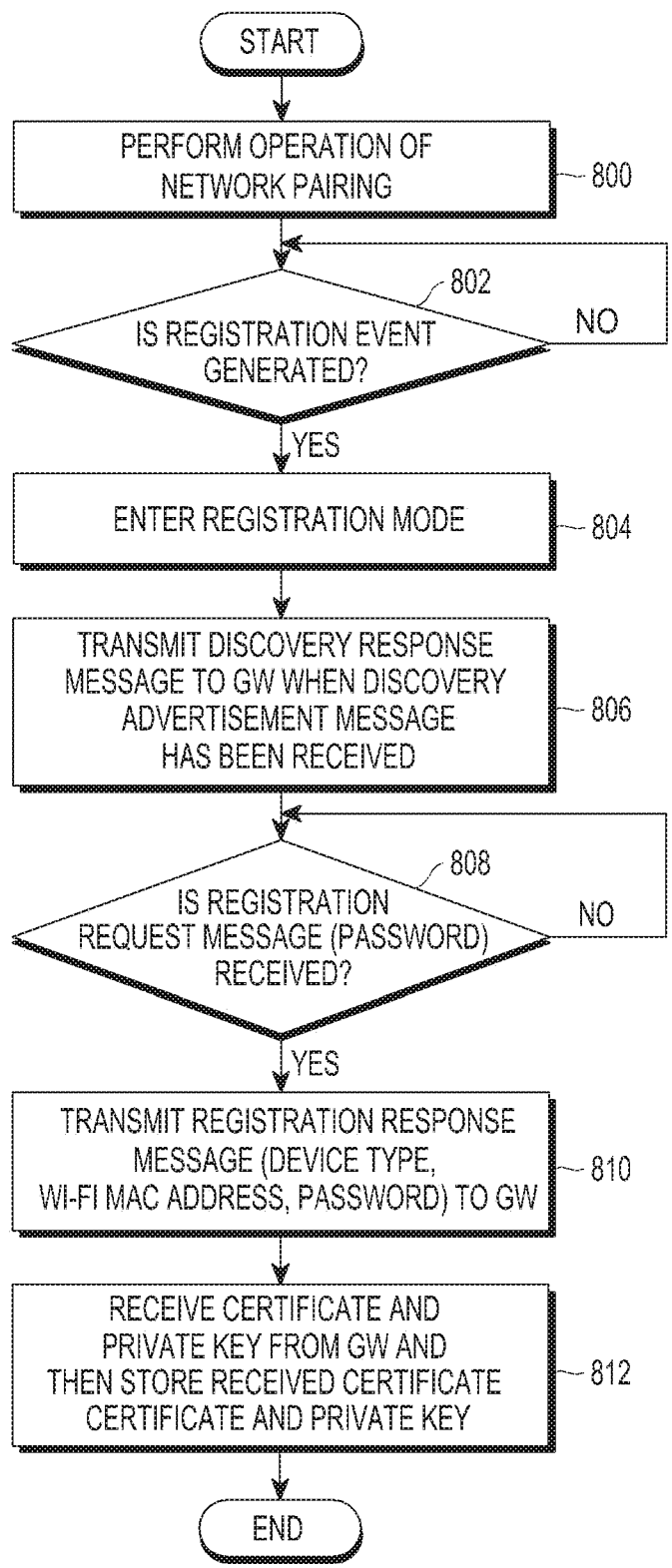
FIG. 8 is a flow chart illustrating an operation in which a headless Wi-Fi device is registered in a GW in a wireless communication system according to an embodiment of the present disclosure.

FIG. 8 is a flow chart illustrating an operation in which a headless Wi-Fi device is registered in a GW in a wireless communication system according to an embodiment of the present disclosure.

Referring to FIG. 8, the headless Wi-Fi device performs an operation of a network pairing through communication with an AP 160 in operation 800 and determines whether a registration event is generated in operation 802. When the registration event is generated, the headless Wi-Fi device enters into a registration mode and drives a timer in operation 804.

When a discovery advertisement message has been received from the GW 120 in operation 806, the headless Wi-Fi device transmits a discovery response message to the GW 120. Herein, information (e.g., a Wi-Fi MAC address and an IP address) on the headless Wi-Fi device may be included in the discovery response message.

The headless Wi-Fi device determines whether a registration request message is received from the GW 120 in operation 808. When the registration request message has been received, the headless Wi-Fi device detects a password for checking message integrity included in the registration request message. Further, the headless Wi-Fi device transmits, to the GW 120, a registration response message including the detected password and a device type and a Wi-Fi MAC address of the headless Wi-Fi device in operation 810.

When the message integrity for the registration response message is checked based on the detected password, the headless Wi-Fi device receives a certificate and a private key from the GW 120 and then stores the certificate and private key in operation 812. The registration process is terminated and then the headless Wi-Fi device forms a channel in which the mutual authentication is possible with the GW 120 based on the stored certificate and private key, thereby perform communication.

Figure 9:
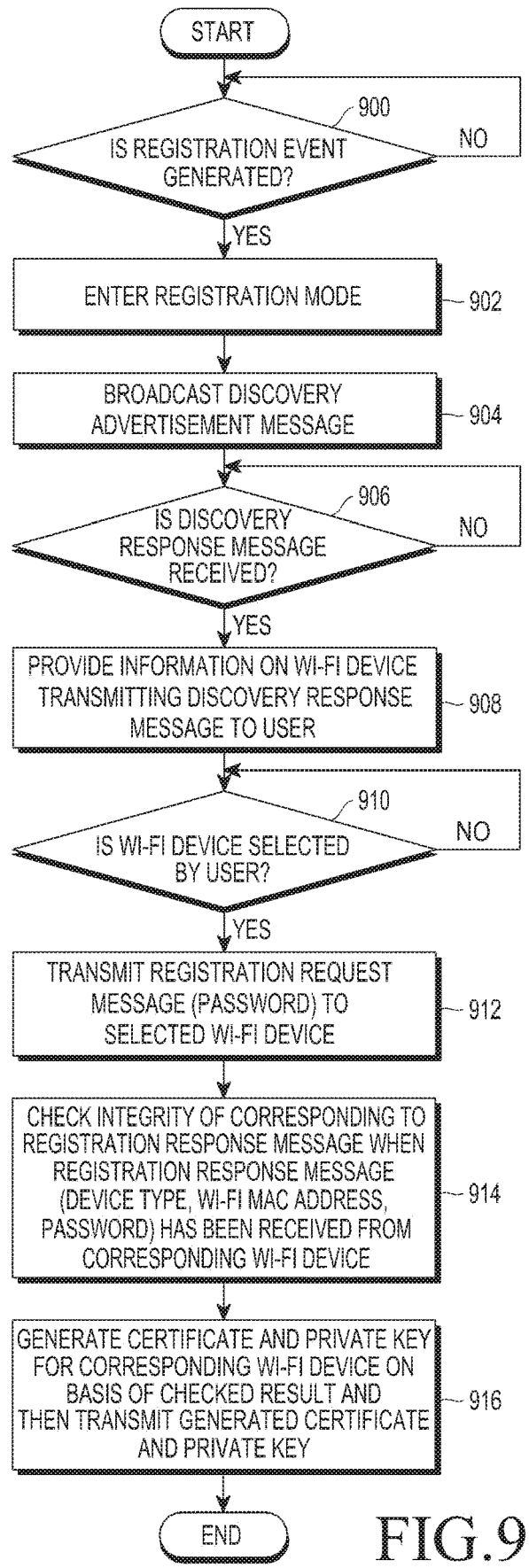
FIG. 9 is a flow chart illustrating an operation in which a GW registers a headless Wi-Fi device in a wireless communication system according to an embodiment of the present disclosure.

FIG. 9 is a flow chart illustrating an operation in which a GW registers a headless Wi-Fi device in a wireless communication system according to an embodiment of the present disclosure.

Referring to FIG. 9, when a registration event is generated in operation 900, the GW 120 enters into a registration mode and drives a timer in operation 902. When there is a request of information on a Wi-Fi device which can be registered by the user 150, the GW 120 broadcasts a discovery advertisement message in operation 904. Meanwhile, the user 150 may perform the request as described above through a product registration page menu by accessing the GW management web page (or application).

The GW 120 determines whether a discovery response message is received in operation 906. When the discover response message has been received, the GW 120 provides, to a user, information on a Wi-Fi device transmitting the discovery response message in operation 908. In addition, when a headless Wi-Fi device has been selected by the user 150 in operation 910, the GW 120 transmits a registration request message including a password for a message integrity check to the selected headless Wi-Fi device in operation 912.

When the registration response message including a device type, a Wi-Fi MAC address, a password has been received from the headless Wi-Fi device in operation 914, the GW 120 checks integrity for the registration response message based on whether a password included in the registration response message is identical to a password included in the registration request message. Further, when the registration response message has the integrity as a result of the check, the GW 120 generates a certificate and a private key for the headless Wi-Fi device and then transmits the certificate and private key to the headless Wi-Fi device 100 in operation 916. The generated certificate and private key may be used to form a channel in which a mutual authentication between the GW 120 and the headless Wi-Fi device is possible.

Figure 10:
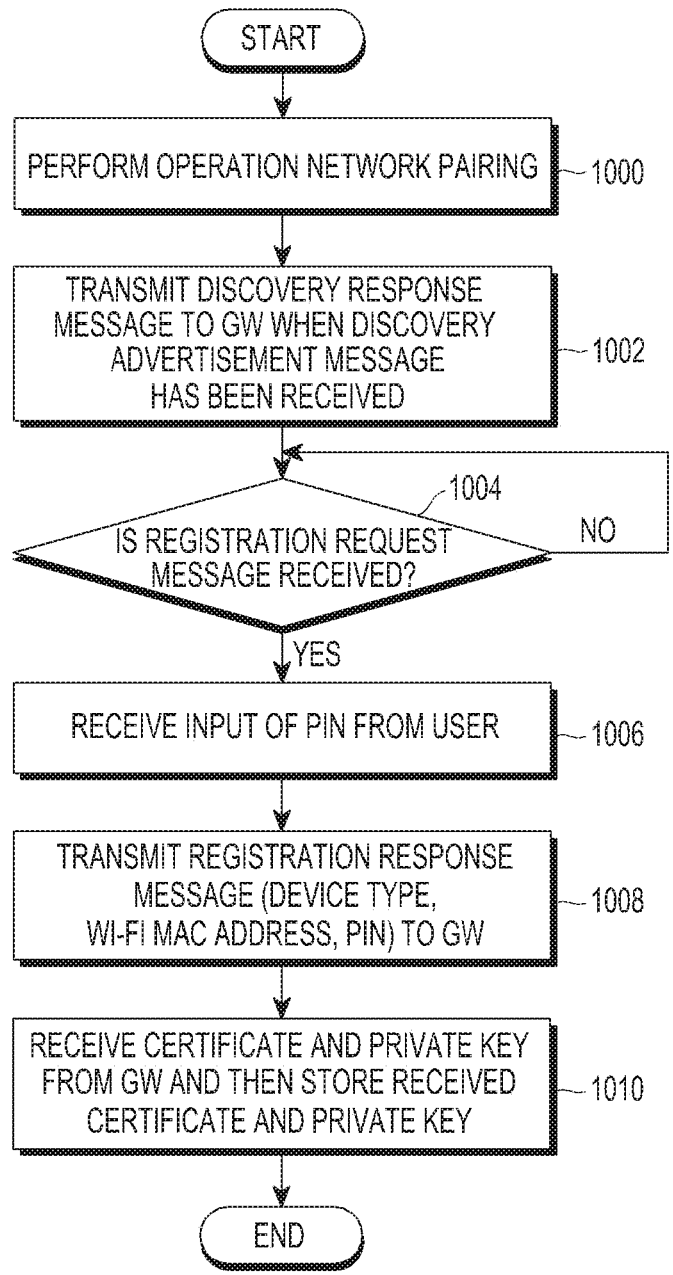
FIG. 10 is a flow chart illustrating an operation in which a display Wi-Fi device is registered in a GW in a wireless communication system according to an embodiment of the present disclosure.

FIG. 10 is a flow chart illustrating an operation in which a display Wi-Fi device is registered to a GW in a wireless communication system according to an embodiment of the present disclosure.

Referring to FIG. 10, the display Wi-Fi device performs an operation of network pairing through communication with an AP 160 in operation 1000. Further, when a discovery advertisement message has been received from the GW 120 in operation 1002, the display Wi-Fi device transmits a discovery response message to the GW 120. Herein, information (e.g., a Wi-Fi MAC address and an IP address) on the display Wi-Fi device may be included in the discovery response message.

The display Wi-Fi device determines whether a registration request message is received from the GW 120 in operation 1004. When the registration request message has been received, the display Wi-Fi device detects a PIN for checking message integrity included in the registration request message. Further, the display Wi-Fi device displays, in the display unit, an input window which can receive an input of a PIN identical to the detected PIN from the user 150. In addition, the display Wi-Fi device receives the input of the PIN through the input window from the user 150 in operation 1006, the display Wi-Fi device transmits, to the GW 120, a registration response message including the input PIN, and a device type and a Wi-Fi MAC address of the display Wi-Fi device in operation 1008.

When the message integrity for the registration response message is checked based on the input PIN, the display Wi-Fi device receives a certificate and a private key from the GW 120 and then stores the certificate and private key in operation 1010. The registration process is terminated and then the display Wi-Fi device forms a channel in which the mutual authentication is possible with the GW 120 based on the stored certificate and private key, thereby performing communication.

Figure 11:
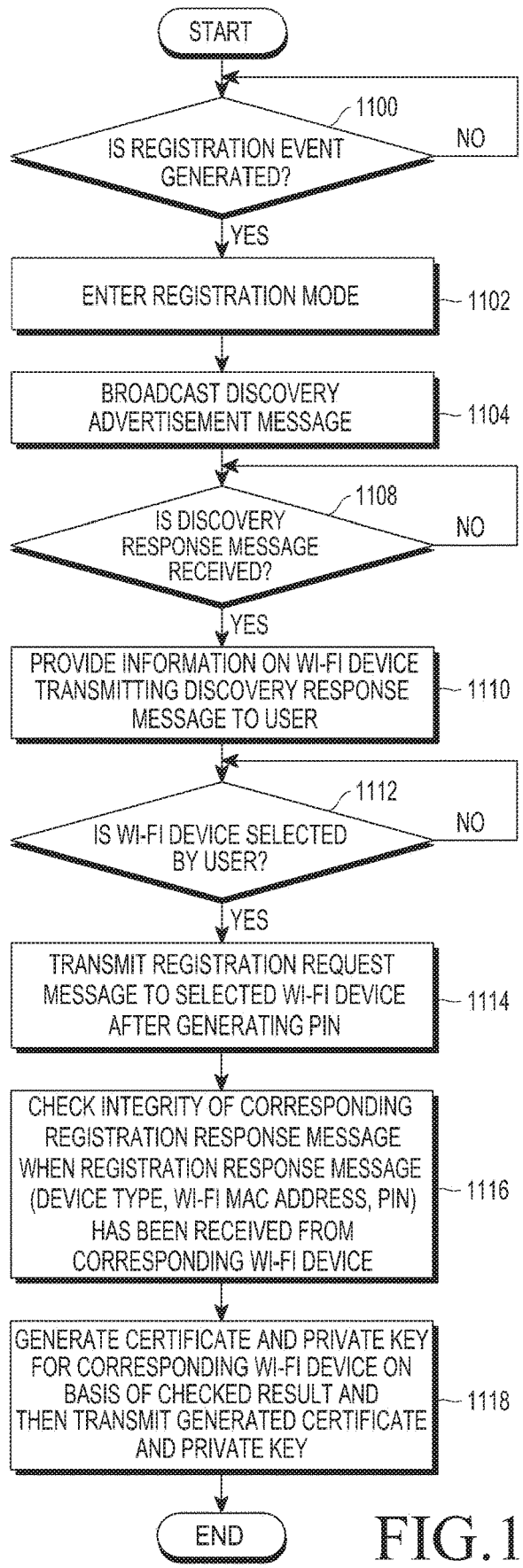
FIG. 11 is a flow chart illustrating an operation in which a GW registers a display Wi-Fi device in a wireless communication system according to an embodiment of the present disclosure.

FIG. 11 is a flow chart illustrating an operation in which a GW registers a display Wi-Fi device in a wireless communication system according to an embodiment of the present disclosure.

Referring to FIG. 11, when a registration event is generated in operation 1100, the GW 120 enters into a registration mode and drives a timer in operation 1102. When there is a request for information on a Wi-Fi device which can be registered by the user 150, the GW 120 broadcasts a discovery advertisement message in operation 1104. Meanwhile, the user 150 may perform the request as described above through a product registration page menu by accessing the GW management web page (or application).

The GW 120 determines whether a discovery response message is received in operation 1108. When the discovery response message has been received, the GW 120 provides information on a Wi-Fi device transmitting the discovery response message in operation 1110. In addition, when a display Wi-Fi device has been selected by the user 150 in operation 1112, the GW 120 transmits a registration request message including a PIN for a message integrity check to the selected display Wi-Fi device in operation 1114.

When the registration response message including a device type, a Wi-Fi MAC address, and a PIN have been received from the display Wi-Fi device in operation 1116, the GW 120 checks integrity for the registration response message based on whether a PIN included in the registration response message is identical to a PIN included in the registration request message.

Further, when the registration response message has integrity as a result of the check, the GW 120 generates a certificate and a private key for the display Wi-Fi device and then transmits the certificate and private key to the display Wi-Fi device in operation 1118. The generated certificate and private key may be used to form a channel in which a mutual authentication between the GW 120 and the display Wi-Fi device is possible.

Figure 12:
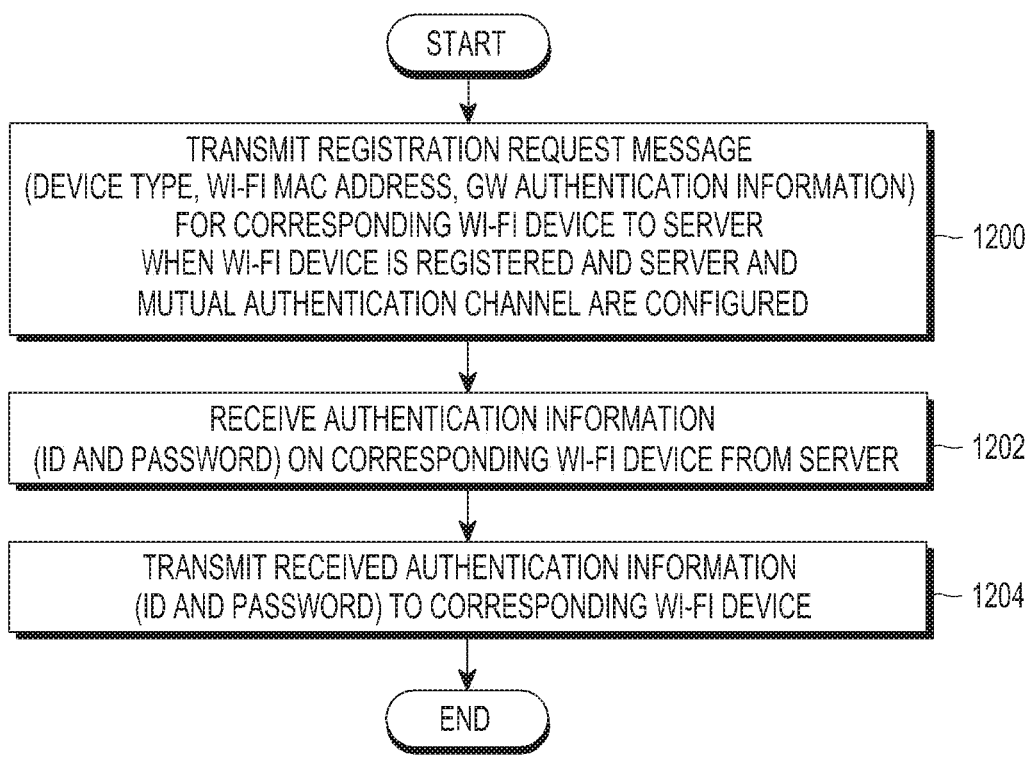
FIG. 12 is a flow chart illustrating an operation in which a GW registers a Wi-Fi device to a server in a wireless communication system according to an embodiment of the present disclosure.

FIG. 12 is a flow chart illustrating an operation in which a GW registers a Wi-Fi device to a server in a wireless communication system according to an embodiment of the present disclosure.

Referring to FIG. 12, in operation 1200, when the Wi-Fi device 100 is registered and a mutual authentication channel with the server 140 is configured, the GW 120 transmits a registration request message (a device type, a Wi-Fi MAC address, and GW authentication information) for the Wi-Fi device 100 to the server 140. Herein, the GW authentication information is transmitted to the server 140 as information for message integrity for the registration request message.

When authentication information (an ID and a password) for the Wi-Fi device 100 has been received by the server 140 in operation 1202, the GW 120 transmits the received authentication information (an ID and a password) to the Wi-Fi device 100 in operation 1204.

Figure 13:
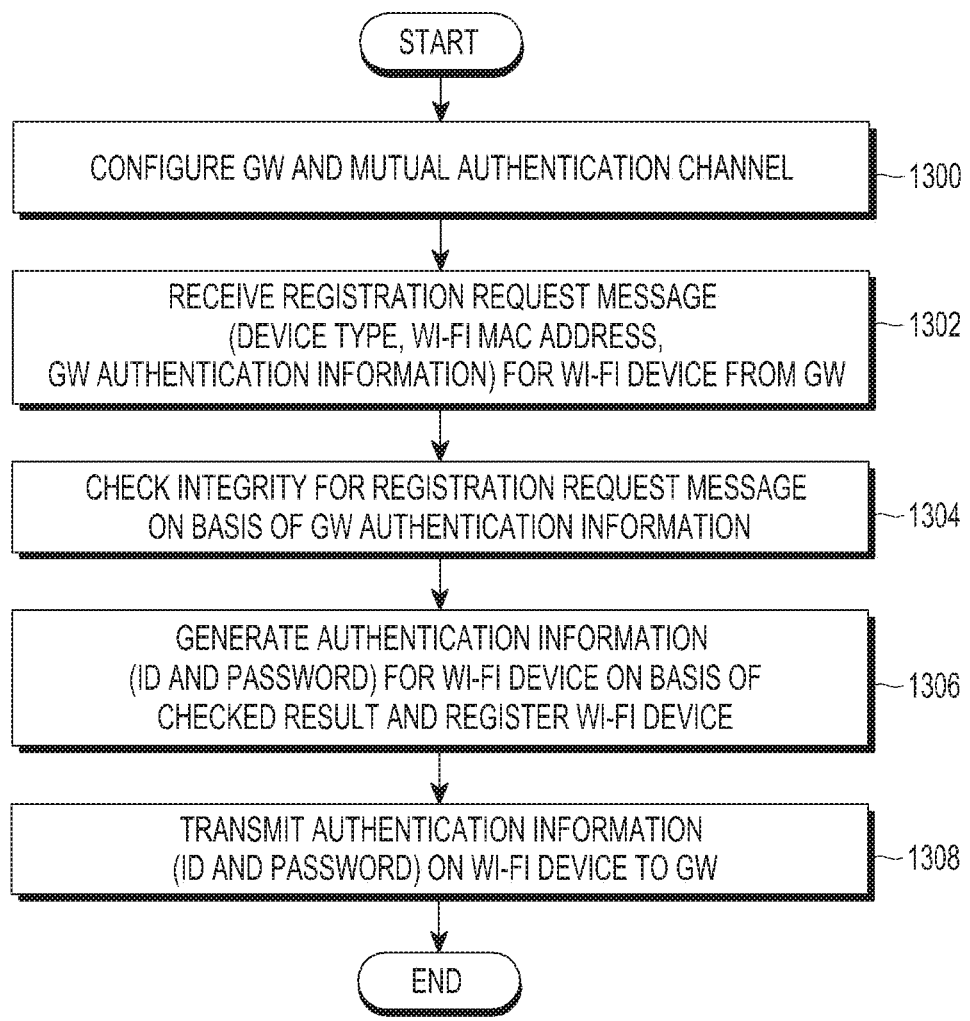
FIG. 13 is a flow chart illustrating an operation in which a server registers a Wi-Fi device through a GW in a wireless communication system according to an embodiment of the present disclosure.

FIG. 13 is a flow chart illustrating an operation in which a server registers a Wi-Fi device through a GW in a wireless communication system according to an embodiment of the present disclosure.

Referring to FIG. 13, the server 140 configures a mutual authentication channel with the GW 120 in operation 1300, and receives a registration request message (a device type, a Wi-Fi MAC address, and GW authentication information) for the Wi-Fi device 100 in operation 1302.

Further, the server 140 checks the integrity for the registration request message based on the GW authentication information in operation 1304. When the registration request message has integrity as a result of the check, the server 140 generates authentication information (an ID and a password) for the Wi-Fi device 100 and registers the Wi-Fi device 100 in operation 1306. The server 140 transmits the authentication information (the ID and password) for the Wi-Fi device 100 to the GW 120 in operation 1308.

Next, an internal configuration of each of the Wi-Fi device 100, the GW 120, and the server 140 according to the embodiment of the present disclosure will be specifically described.

Figure 14:
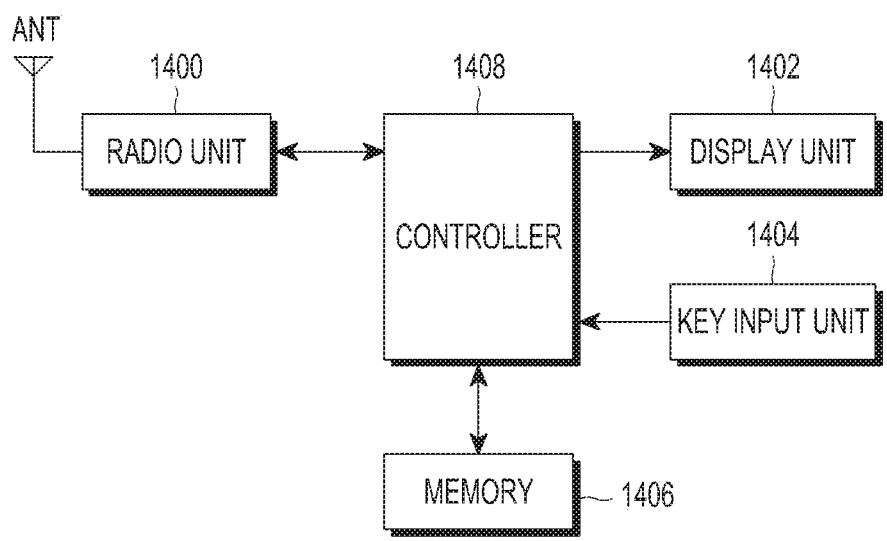
FIG. 14 is a block diagram illustrating a configuration of a Wi-Fi device according to an embodiment of the present disclosure.

FIG. 14 is a block diagram of a configuration of a Wi-Fi device according to an embodiment of the present disclosure.

Referring to FIG. 14, the Wi-Fi device 100 includes a radio unit 1400, a display unit 1402, a key input unit 1404, a memory 1406, and a controller 1408.

The radio unit 1400 may include an interface for Wi-Fi communication as a component for performing wireless communication of the Wi-Fi device 100.

Further, the display unit 1402 is a component for displaying various pieces of information generated according to an operation of the Wi-Fi device 100 and the key input unit 1404 is a component for receiving an input from a user.

The display unit 1402 and key input unit 1404 may exist as one physical component when the Wi-Fi device 100 is a touch screen type device. In addition, the display unit 1402 may not be included in the Wi-Fi device 100 when the Wi-Fi device 100 is a headless Wi-Fi device.

The memory 1406 stores authentication information (an ID and a password) acquired in registration and authentication processes of the Wi-Fi device 100 and various pieces of information generated according to the operation of the Wi-Fi device 100.

The controller 1408 controls an overall operation of the Wi-Fi device 100 by controlling the radio unit 1400, the display unit 1402, the key input unit 1404, and the memory 1406. Especially, the controller 1408 controls the components to perform an operation of the Wi-Fi device according to the processes (2-1), (2-2), and (3) as described above.

Figure 15:
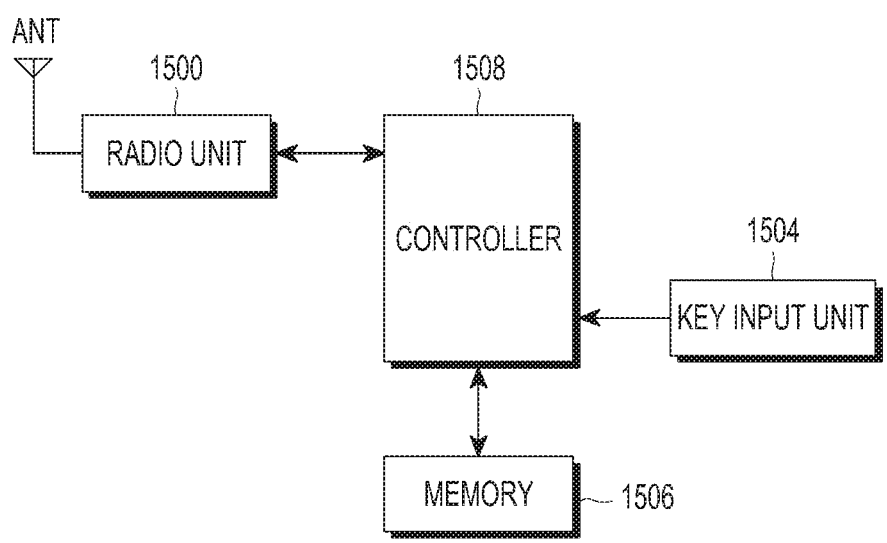
FIG. 15 is a block diagram illustrating a configuration of a GW according to an embodiment of the present disclosure.

FIG. 15 is a block diagram of a configuration of a GW according to an embodiment of the present disclosure.

Referring to FIG. 15, the GW 120 includes a radio unit 1500, a key input unit 1504, a memory 1506, and a controller 1508.

The radio unit 1500 may include an interface for performing communication with the Wi-Fi device 100 and the server 140 as a component for performing wireless communication of the GW 120.

Further, the key input unit 1504 may include, for example, a key generating a registration event so as to enter into a registration mode as a component for receiving an input from the user.

The memory 1506 stores authentication information (an ID and a password) acquired in registration and authentication processes of the GW 120 and various pieces of information generated according to the operation of the GW 120.

The controller 1508 controls an overall operation of the GW 120 by controlling the radio unit 1500, the key input unit 1504, and the memory 1506. Especially, the controller 1508 controls the components to perform an operation of the GW according to the processes (1), (2-1), (2-2), and (3) as described above.

Figure 16:
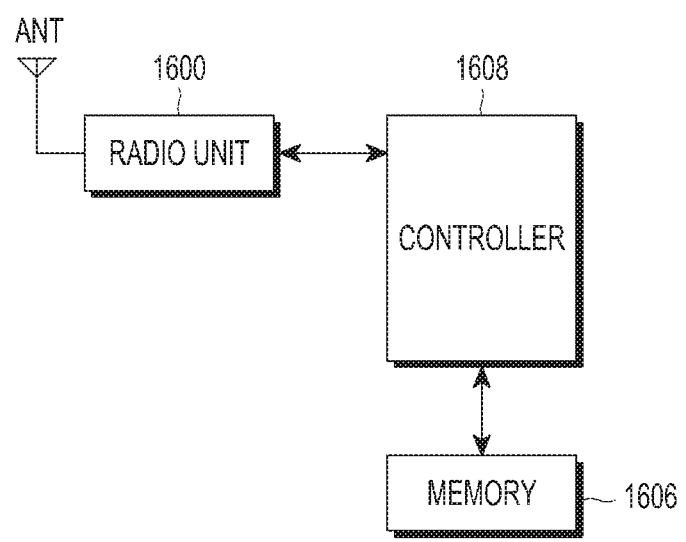
FIG. 16 is a block diagram illustrating a configuration of a server according to an embodiment of the present disclosure.

FIG. 16 is a block diagram illustrating a configuration of a server according to an embodiment of the present disclosure.

Referring to FIG. 16, the server 140 includes a radio unit 1600, a memory 1606, and a controller 1608.

The radio unit 1600 may include an interface for performing communication with the GW 120 as components for performing wireless communication of the server 140.

Further, the memory 1606 stores authentication information (an ID and a password) acquired in registration and authentication processes of the GW 120 and the Wi-Fi device 100 and various pieces of information generated according to the operation of the sever 140.

The controller 1608 controls an overall operation of the server 140 by controlling the radio unit 1600 and the memory 1606. In particularly, the controller 1608 controls the components to perform the operation of the server according to the processes (1) and (3).

It will be understood that a method and apparatus according to an embodiment of the present disclosure may be implemented in the form of hardware, software, or a combination of hardware and software. Any such software may be stored, for example, in a volatile or non-volatile storage device such as a read-only memory (ROM), a memory such as a random access memory (RAM), a memory chip, a memory device, or a memory integrated chip (IC), or a recordable optical or magnetic medium such as a compact disc (CD), a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of registering and authenticating a device by a server in a wireless communication system, the method comprising:
receiving, from a gateway (GW), a first registration request message requesting registration of the GW, the first registration request message including first information on the GW;
identifying whether the first information on the GW corresponds to second information stored in the server;
transmitting, to the GW, first authentication information on the GW, wherein the first authentication information includes an identifier (ID) and a password for authenticating the GW, wherein the ID and the password are, based on the first information corresponding to the second information, assigned by the server;
setting up a first authentication channel between the GW and the server based on the first authentication information;
receiving, from the GW, a second registration request message requesting registration of the device through the first authentication channel, wherein the second registration request message includes the ID and the password;
generating second authentication information on the device; and
transmitting, to the GW, the second authentication information through the first authentication channel.

2. The method of claim 1,
wherein the second authentication information is transmitted from the GW to the device through a second authentication channel, and
wherein the second authentication channel is set between the GW and the device based on a certificate for the device generated by the GW.

3. The method of claim 2,
wherein the certificate is generated by the GW based on whether a first password corresponds to a second password, and
wherein the first password is included in a third registration request message transmitted from the GW to the device, and the second password is included in a registration response message transmitted from the device to the GW.

4. The method of claim 1,
wherein the first authentication information is transmitted to the GW in a registration mode, and
wherein the registration mode indicates a mode for performing an operation in which the GW is registered to the server, and the registration mode is performed during a predetermined time interval.

5. The method of claim 4, wherein the predetermined time interval includes a time interval predetermined from a time when an interface for entering into the registration mode has been selected in the GW.

6. The method of claim 1, wherein the first information includes at least one of a medium access control (MAC) address information of the GW and user identification information of the GW.

7. The method of claim 1, wherein the second registration request message includes information on the device.

8. The method of claim 7, wherein the information on the device includes information about a type of the device and medium access control (MAC) address information of the device.

9. The method of claim 1, wherein the second authentication information further includes an ID and a password for authenticating the device.

10. A server in a wireless communication system, comprising:
a transceiver; and
a processor configured to:
control the transceiver to receive, from a gateway (GW), a first registration request message requesting registration of the GW, the first registration request message including first information on the GW, identify whether the first information on the GW corresponds to second information stored in the server, control the transceiver to transmit, to the GW, first authentication information on the GW, wherein the first authentication information includes an identifier (ID) and a password for authenticating the GW, wherein the ID and the password are, based on the first information corresponding to the second information, assigned by the server, set up a first authentication channel between the GW and the server based on the first authentication information, control the transceiver to receive, from the GW, a second registration request message requesting registration of a device through the first authentication channel, wherein the second registration request message includes the ID and the password, generate second authentication information on the device, and control the transceiver to transmit, to the GW, the second authentication information through the first authentication channel.

11. The server of claim 10, wherein the second authentication information is transmitted from the GW to the device through a second authentication channel, and wherein the second authentication channel is set between the GW and the device based on a certificate for the device generated by the GW.

12. The server of claim 11, wherein the certificate is generated by the GW based on whether a first password corresponds to a second password, and wherein the first password is included in a third registration request message transmitted from the GW to the device, and the second password is included in a registration response message transmitted from the device to the GW.

13. The server of claim 10, wherein the first authentication information is transmitted to the GW in a registration mode, and wherein the registration mode indicates a mode for performing an operation in which the GW is registered to the server, and the registration mode is performed during a predetermined time interval.

14. The server of claim 13, wherein the predetermined time interval includes a time interval predetermined from a time when an interface for entering into the registration mode has been selected in the GW.

15. The server of claim 10, wherein the first information includes at least one of a medium access control (MAC) address information of the GW and user identification information of the GW.

16. The server of claim 10, wherein the second registration request message includes information on the device.

17. The server of claim 16, wherein the information on the device includes information about a type of the device and medium access control (MAC) address information of the device.

18. The server of claim 10, wherein the second authentication information further includes an ID and a password for authenticating the device.

* * * * *